June 8, 1926.
E. J. KOLODZIEJ
SHOCK ABSORBER
Filed Dec. 5, 1925
1,587,592
2 Sheets-Sheet 1
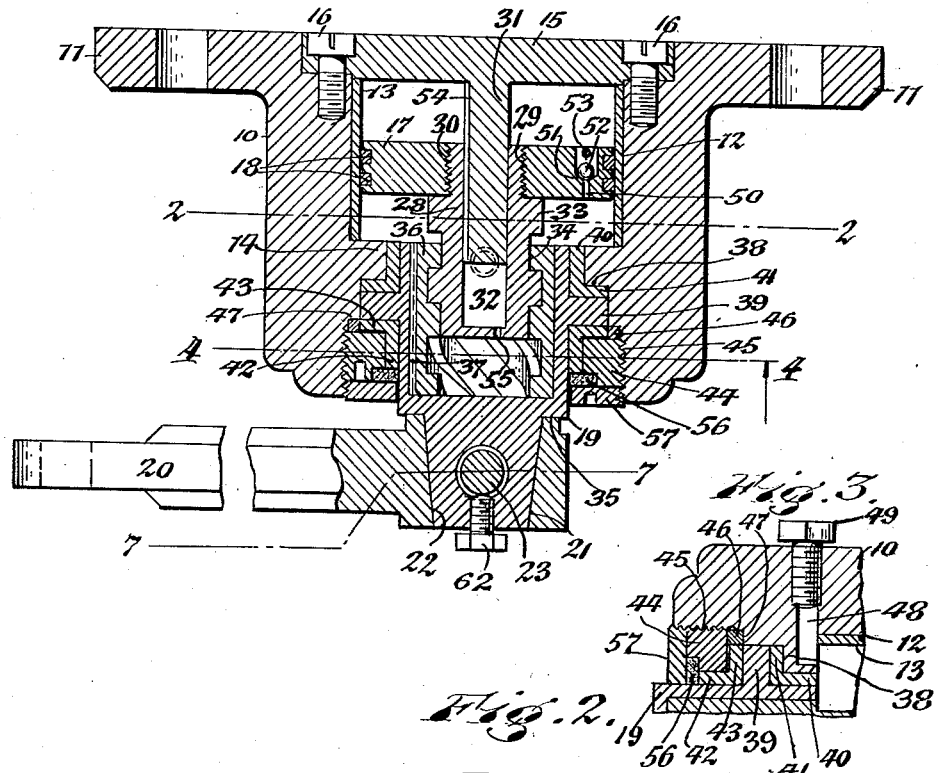
Inventor
Edward J. Kolodziej June 8, 1926.
E. J. KOLODZIEJ
SHOCK ABSORBER
Filed Dec. 5, 1925
1,587,592
2 Sheets-Sheet 2
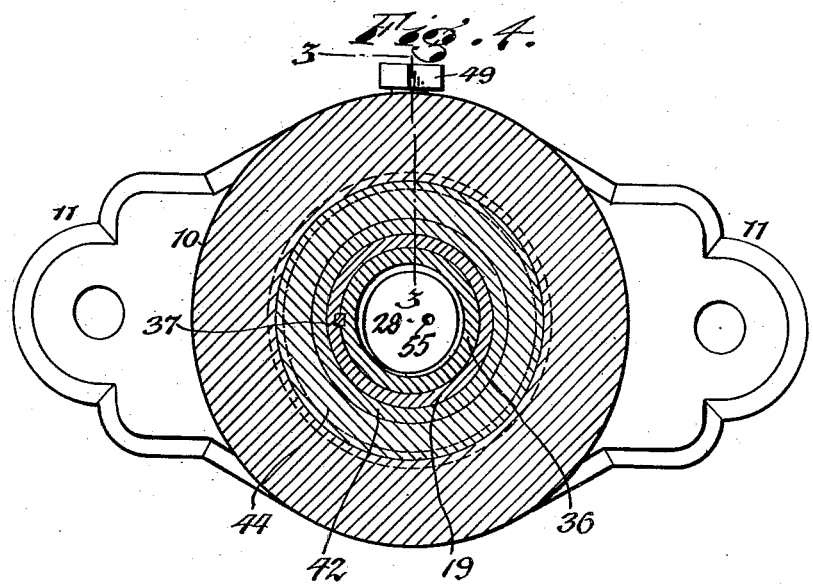
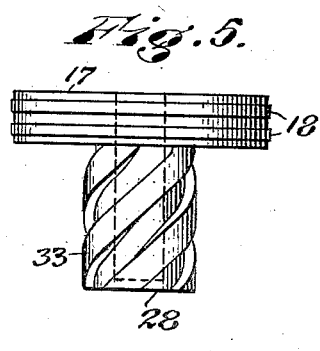
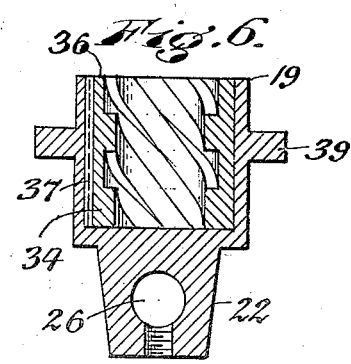
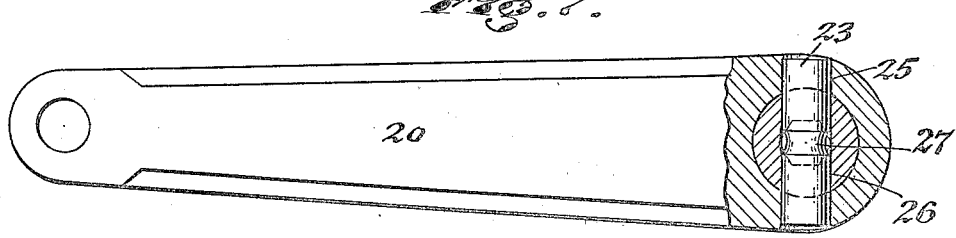

Patented June 8, 1926.

1,587,592

UNITED STATES PATENT OFFICE.

EDWARD J. KOLODZIEJ, OF BUFFALO, NEW YORK.

SHOCK ABSORBER.

Application filed December 5, 1925. Serial No. 73,333.

This invention relates to a shock absorber or cushioning device which is adapted to be placed between two relatively moving parts such as the body or frame and the axle of an automobile, for the purpose of absorbing or cushioning the shock which is ordinarily produced by such movement and thereby contributing to the comfort of the passengers who are riding in the car or saving from danger the merchandise or other materials which may be carried by the same.

It is the object of this invention to provide an apparatus of this character which is more efficient in operation, less costly in production and one requiring a minimum amount of attention for the purpose of keeping the same in an operative condition.

With this end in view this invention consists generally of a cylinder which is adapted to be mounted on one of the relatively movable members, a rock shaft adapted to be operatively connected with the other relatively movable member, a piston moving lengthwise in the cylinder and adapted to encounter a high fluid resistance while moving in one direction and a low fluid resistance while moving in the opposite direction, a screw connection between said piston and said rock shaft, means for permitting fluid to pass comparatively free from one end of the cylinder to the other during the low compression stroke of the piston and to restrict this flow during the high compression stroke of the piston, and means for journalling the shaft on the cylinder in such manner as to reduce to a minimum the possibility of leakage through the joint between the rock shaft and the cylinder so that frequent renewal of the resistance liquid in the cylinder is rendered unnecessary.

In the accompanying drawings:

Figure 1 is a horizontal longitudinal section of the preferred embodiment of my invention.

Figure 2 is a vertical section taken on line 2—2 Fig. 1.

Figure 3 is a fragmentary vertical section taken on line 3—3 Fig. 4.

Figure 4 is a vertical section taken on line 4—4 Fig. 1.

Figure 5 is a side view of the piston and its exterior screw threaded piston rod.

Figure 6 is a longitudinal section of the rock shaft and its interior screw threaded bushing.

Figure 7 is a fragmentary section taken on line 7—7 Fig. 1.

Similar characters of reference indicate corresponding parts throughout the several views of the drawings.

The numeral 10 represents generally the casing of the shock absorber which is adapted to be attached to one of the relatively movable members of an automobile so as to be carried thereby. In the present instance this casing is designed to be attached to the frame or body of an automobile by providing the inner or rear end of this casing with laterally projecting lugs 11 adapted to be secured to the car frame by means of bolts or other suitable fastenings. This casing is provided with a horizontal cylinder 12 which may be provided in its bore with a suitable lining 13. At its front or outer end this cylinder is closed by means of a head 14 which is formed integrally therewith and at its inner or rear end this cylinder is closed by a rear head 15 which is detachably connected at its margin with the rear end of the cylinder by means of bolts 16 or other appropriate fastenings whereby this end of the cylinder may be uncovered for the purpose of introducing or removing the parts which are normally arranged within the cylinder. These parts include a piston 17 which is movable lengthwise in the cylinder but held against turning therein and is provided on its periphery with packing rings 18 so as to form a practically tight joint between the bore of the cylinder and the periphery of the piston. In the outer head 14 of the cylinder is journaled a rock shaft 19 which is adapted to be rocked by operatively connecting the same with the other relatively movable member of the car which in the present instance is supposed to be the axle of the car. This rocking movement is preferably transmitted to the rock shaft by means of a vertically movable rock arm 20 the free end of which is adapted to be connected with the car axle while its inner end or hub is provided with a conical opening 21 which receives a conical shank 22 at the outer or front end of the rock shaft. This rock arm and rock shaft are preferably securely interlocked with each other so as to compel the same to turn together for which purpose a pin 23 is employed which is passed transversely through corresponding openings 25 and 26 formed respectively in the hub of the rock arm 20 and the shank of the rock shaft, as shown in Fig. 7. Disengagement of this pin from the rock arm and shaft is prevented by means of a set screw 62 working lengthwise in a threaded opening in the outer end of the shank 22 and engaging its inner end with an annular groove 27 on the central part of the locking pin 23, as shown in Fig. 1.

By this means the rock arm and rock shaft are securely coupled and prevented from becoming accidentally disconnected when subjected to the vibration of the car while the same is running.

The rock shaft is so mounted in the outer or front head of the cylinder that the same is free to turn but incapable of longitudinal motion, and a screw connection is provided between this rock shaft and the piston 17 so that upon rocking the shaft a longitudinally reciprocating motion will be imparted to the piston. The preferred means for effecting this connection between the rock shaft and the piston are constructed as follows:

The numeral 28 represents a piston rod which projects forwardly from the piston. This piston rod is preferably made separate from the piston for convenience in manufacture and is connected therewith by means of an external screw thread 29 arranged on the rear part of the piston rod and engaging with an internally threaded opening 30 on the central part of the piston, as shown in Fig. 1. This piston rod, therefore, in effect forms an integral part of the piston and these two members therefore practically form one piece and are only capable of reciprocating lengthwise in the cylinder but incapable of turning therein. The means for thus holding the piston and piston rod against turning which are shown in the drawings consist of a post 31 of non-circular form in cross section projecting forwardly from the central part of the rear head of the cylinder and arranged with its front end in a non-circular recess or opening 32 in the piston rod 28. In the preferred form of the post 31 the same is square in cross section and the opening 32 in the piston rod is of corresponding form, so that when these parts engage with each other, as shown in Fig. 2, rotation of the piston rod and piston relative to the cylinder is possibly prevented and longitudinal movement of the same is permitted. The post 31 is preferably formed integrally with the rear piston head 15, but if desired the same may be made separate therefrom and attached thereto in any approved manner.

On its exterior the piston rod 28 is provided with a square screw thread 33 which is comparatively coarse and sturdy. This thread engages with an internal screw thread 34 of corresponding form arranged on the rock shaft 19. Instead of forming this internal thread directly on the rock shaft the latter is provided with a recess 35 extending forwardly from the inner end thereof and in this recess is arranged a bushing 36 in the bore of which the thread 34 is formed, said bushing and rock shaft being connected with each other by means of a key 37 so that they practically form one piece and are compelled to turn together.

This organization of the rock shaft and its internal screw thread permits of readily manufacturing the same at low cost.

Various means may be employed for rotatably mounting the rock shaft in the outer head of the cylinder but the construction of the bearing for this purpose and the means for resisting longitudinal movement and preventing leakage which are shown in the drawings are preferred and as there shown these means are constructed as follows:

The numeral 38 represents an annular forwardly facing shoulder formed on the inner part of the central opening formed in the front or outer head of the cylinder and adapted to receive the inward or rearward thrust of a thrust collar 39 formed circumferentially on the central part of the rock shaft. Between the inner end of the rock shaft and the rear side of its thrust collar 39 is interposed a bearing ring which consists of a longitudinal tubular body 40 interposed between the bore of the front cylinder head and the periphery of the rock shaft, and an annular flange 41 projecting laterally from the front end of this tubular body and interposed between the rear side of the thrust collar 39 and the forwardly facing thrust shoulder 38, as shown in Fig. 1. A similar bearing ring is provided for the front end of the rock shaft and consists of a tubular body 42 surrounding the front part of the rock shaft and an annular flange 43 projecting laterally from the rear end of the body 42 and engaging with the front side of the thrust collar 39. The two bearing rings and the thrust collar between the same are held in proper engagement with each other and in their proper position relatively to the thrust shoulder 38 by means of a retaining ring 44 having a screw threaded connection 45 with the front end of the casing 10 and closely fitting around the periphery of the tubular body 42 of the front bearing ring and having its inner end facing the flange 43 of this bearing ring. In order, however, to prevent the retaining ring 44 from being screwed inwardly to such an extent as would actually grip the thrust collar 39 between the bearing rings, a spacing ring 46 is provided which surrounds the flange 43 of the front bearing ring and rests against a forwardly facing shoulder 47 on the casing while its front side is engaged by the rear side of the retaining ring 44. This spacing ring 46 is slightly thicker than the flange 43 of the front bearing ring so that when the retaining ring 44 is screwed inwardly as tight as possible the spacing ring 46 which arrests the inward movement of this retaining ring will hold the latter away from the flange 43 of the front packing ring a very minute distance and thereby preventing the thrust collar 39 from being gripped so that there will be no interference with the free rotation of the rock shaft and still hold the same against any perceptible longitudinal movement.

The longitudinal movement of the piston within the cylinder is resisted by a liquid which preferably consists of oil or other fluid which will not be affected materially by variations in temperature. It is preferable to employ for this purpose the finest grade of machine oil. This liquid is filled into the cylinder through a filling opening 48 formed in the top of the front end thereof which opening is normally closed by means of a screw plug 49, as shown in Fig. 3. Means are provided whereby during the backward movement of the piston a high pressure resistance will be encountered by highly restricting the escape of the liquid from the rear end of the cylinder at this time, thereby enabling this apparatus to absorb or cushion heavy shocks, such as for instance, the rebound of the springs of an automobile if the same had been compressed when the wheels drop into an opening in the road or strike an obstruction thereon. During the forward or outward movement however of the piston the resistance liquid in the front end of the cylinder is permitted to escape therefrom with great freedom so that a comparatively low resistance is offered to the forward movement of the piston and its cushioning or shock absorbing effect is therefore reduced, thereby resisting only to a moderate extent the movement of the body and axle of the car toward each other while compressing the springs. Various means may be provided for causing the resistance liquid to operate in the manner indicated but this is preferably accomplished by means of a relief port 50 formed in the piston and provided with a rearwardly facing valve seat 51, and a check valve 52 movable toward and from the seat 51 and held on the piston by means of a retaining pin 53. The post 31 is also provided on one side with a longitudinal by-pass 54 which places the rear end of the cylinder in communication with the recess 32 in the piston rod and the front end of the rod is provided with an opening 55 which places the recess 32 in communication with the interior of the rock shaft bushing, as shown in Fig. 1. During the rearward motion of the piston the valve 52, is closed so that the resistance liquid in the rear end of the cylinder is practically confined therein excepting so much thereof as is permitted to escape through the by-pass 54 into the recess 32 and from thence through the opening 55 to the rock shaft bushing, thereby exerting a very high pressure resistance to the movement of the piston in this direction and enabling the same to absorb or cushion a correspondingly high shock. During the return or forward movement of the piston the valve 52 opens under the pressure of the liquid against the same and permits the liquid to flow from the front end of the cylinder through the port 50 and to the rear end of the cylinder with comparative freedom whereby the resisting effect of the liquid in the front end of the cylinder against the forward movement of the piston at this time is materially reduced and a corresponding reduction in the shock absorbing or cushioning effect of the same is exerted.

In order to reduce to a minimum the possibility of leakage of hydraulic resisting medium from the cylinder through the joint between the rock shaft and the casing a packing device is provided preferably consisting of a packing ring 56 surrounding the front part of the rock shaft and bearing with its inner or rear side against the front bearing ring and the retaining ring 44, and a gland ring 57 having a screw connection with the casing and bearing against the front side of the packing ring 56 and the front side of the retaining ring 44, as shown in Figs. 1 and 3.

As a whole this shock absorber is very efficient in operation, its construction is such that the same can be very easily machined and the several parts assembled easily and conveniently and the same is not liable to get out of order under the severest usage to which the same may be subjected.

I claim as my invention:

1. A shock absorber for cushioning two relatively movable parts, comprising a cylinder adapted to be mounted on one of said parts and provided with a stationary rear head, a non-circular post projecting forwardly from said head, a piston movable lengthwise in said cylinder, a piston rod projecting forwardly from said piston and having a non-circular recess which receives said post and also provided with an external screw thread, and a tubular rock shaft journaled on the front end of said cylinder and adapted to be operatively connected with the other relatively movable part and provided with an internal screw thread engaging with the external thread of said piston rod.

2. A shock absorber for cushioning two relatively movable parts, comprising a cylinder adapted to be mounted on one of said parts and provided with a stationary rear head, a non-circular post projecting forwardly from said head, a piston movable lengthwise in said cylinder, a piston rod projecting forwardly from said piston and having a non-circular recess which receives said post and also provided with an external screw thread, and a tubular rock shaft journaled on the front end of said cylinder and provided with an internal screw thread which engages with the internal thread of said piston rod, and a rock arm arranged on the front end of said shaft and adapted to be connected with the other relatively movable parts.

3. A shock absorber for cushioning two relatively movable parts, comprising a cylinder adapted to be mounted on one of said parts, and provided with a stationary rear head, a non-circular post projecting forwardly from said head, a piston movable lengthwise in said cylinder, a piston rod projecting forwardly from said piston and having a non-circular recess which receives said post and also provided with an external screw thread and a tubular rock shaft journaled on the front end of said cylinder and adapted to be operatively connected with the other relatively movable part and provided with an internal screw thread engaging with the external thread of said piston rod, said piston having a post provided with a rearwardly opening valve and said post provided with a longitudinal by-pass establishing communication between the front and rear ends of said cylinder.

4. A shock absorber for cushioning two relatively movable parts, comprising a cylinder adapted to be connected with one of said parts and having an integral front head at its front end and a rear head which is detachably connected with the rear end of said cylinder, a non-circular post projecting forwardly from said rear head, a piston movable lengthwise in said cylinder and provided with a non-circular opening which receives said post, and a rock shaft journaled in the front head of the cylinder and having a screw connection with said piston and adapted to be connected with the other relatively movable part.

5. A shock absorber for cushioning two relatively movable parts, comprising a cylinder adapted to be connected with one of said parts and having an integral front head at its front end and a rear head which is detachably connected with the rear end of said cylinder, a piston movable lengthwise in said cylinder and held against turning, a rock shaft having a screw connection with said piston and adapted to be connected with the other relatively movable part, and means for journaling said rock shaft in said front head, the said means holding the rock shaft against longitudinal movements.

6. A shock absorber for cushioning two relatively movable parts, comprising a cylinder adapted to be connected with one of said parts and having an integral front head at its front end and a rear head which is detachably connected with the rear end of said cylinder, a piston movable lengthwise in said cylinder and held against turning, a rock shaft having a screw connection with said piston and adapted to be connected with the other relatively movable part, and means for journaling said rock shaft in said front head, the said means holding the rock shaft against longitudinal movement comprising a forwardly facing shoulder arranged on the front head of the cylinder around said shaft, an annular thrust collar arranged on the periphery of said shaft and having its rear side supported on said shoulder, and a retaining ring secured to said front head opposite the front side of the collar on said shaft.

7. A shock absorber for cushioning two relatively movable parts, comprising a cylinder adapted to be connected with one of said parts and having an integral front head at its front end and a rear head which is detachably connected with the rear end of said cylinder, a piston movable lengthwise in said cylinder and held against turning, a rock shaft having a screw connection with said piston and adapted to be connected with the other relatively movable part, and means for journaling said rock shaft in said front head, the said means holding the rock shaft against longitudinal movement comprising a forwardly facing shoulder arranged on the front head of the cylinder around said shaft, an annular thrust collar arranged on the periphery of said shaft and having its rear side supported on said shoulder, a retaining ring secured to said front head opposite the front side of the collar on said shaft, a rear bearing ring having a tubular body interposed between the rear end of the shaft and the bore of said shoulder and a laterally projecting flange interposed between the rear side of said collar and the front side of said shoulder, and a front bearing ring having a tubular body interposed between the front part of said shaft and the bore of said retaining ring and a laterally projecting flange interposed between the front side of said collar and the rear side of the retaining ring.

8. A shock absorber for cushioning two relatively movable parts, comprising a cylinder adapted to be connected with one of said parts and having an integral front head at its front end and a rear head which is detachably connected with the rear end of said cylinder, a piston movable lengthwise in said cylinder and held against turning, a rock shaft having a screw connection with said piston and adapted to be connected with the other relatively movable part, and means for journaling said rock shaft in said front head, the said means holding the rock shaft against longitudinal movement comprising a forwardly facing shoulder arranged on the front head of the cylinder around said shaft, an annular thrust collar arranged on the periphery of said shaft and having its rear side supported on said shoulder, a retaining ring secured to said front head opposite the front side of the collar on said shaft, and a spacing ring interposed between said shoulder and said retaining ring.

9. A shock absorber for cushioning two relatively movable parts, comprising a cylinder adapted to be connected with one of said parts and having an integral front head at its front end and a rear head which is detachably connected with the rear end of said cylinder, a piston movable lengthwise in said cylinder and held against turning, a rock shaft having a screw connection with said piston and adapted to be connected with the other relatively movable part, and means for journaling said rock shaft in said front head, the said means holding the rock shaft against longitudinal movement comprising a forwardly facing shoulder arranged on the front head of the cylinder around said shaft, an annular thrust collar arranged on the periphery of said shaft and having its rear side supported on said shoulder, a retaining ring secured to said front head opposite the front side of the collar on said shaft, a packing ring surrounding the front end of said shaft and bearing against said retaining ring, and a gland bearing against said packing ring and connected with the front head of said cylinder.

10. A shock absorber for cushioning two relatively movable members, comprising a cylinder adapted to be connected with one of said members and having front and rear heads, a piston movable lengthwise in the cylinder but held against turning therein, a piston rod projecting forwardly from the piston and having an external screw thread, and a tubular rock shaft journaled on the front head and adapted to be operatively connected with the other member and provided with an internally threaded bushing which turns with said shaft and which engages with said piston rod.

11. A shock absorber for cushioning two relatively movable members, comprising a cylinder adapted to be connected with one of said members and having front and rear heads, a piston movable lengthwise in the cylinder but held against turning therein, a piston rod projecting forwardly from the piston and having an external screw thread, a tubular rock shaft journaled on the front head and having an internal screw thread engaging with the thread of said rod and having a conical front end, a rock arm having a conical opening which receives the conical part of said shaft and adapted to be connected with the other relatively movable member, a pin passing through said arm and shaft, and a set screw arranged on the outer end of said shaft and engaging said pin.

EDWARD J. KOLODZIEJ.